United States Patent [19]
Ichida

[11] Patent Number: 5,919,106
[45] Date of Patent: Jul. 6, 1999

[54] QUICK RELEASE DERAILLEUR

[75] Inventor: Tadashi Ichida, Sakai, Japan

[73] Assignee: Shimano, Inc., Osaka, Japan

[21] Appl. No.: 08/847,073

[22] Filed: Apr. 30, 1997

[51] Int. Cl.⁶ .................................................. F16H 9/00
[52] U.S. Cl. ................................................ 474/82; 474/78
[58] Field of Search ............................. 474/69, 78, 79, 474/80, 81, 82

[56] References Cited

U.S. PATENT DOCUMENTS

| | | | |
|---|---|---|---|
| 3,854,753 | 12/1974 | Hautier | 280/236 |
| 4,384,864 | 5/1983 | Bonnard | 474/82 |
| 4,443,208 | 4/1984 | Kozakae | 474/82 |
| 4,624,151 | 11/1986 | Huret | 474/82 |
| 4,676,118 | 6/1987 | Leiter | 474/82 |
| 4,724,692 | 2/1988 | Turin et al. | 70/225 |
| 4,731,046 | 3/1988 | Juy | 474/82 |
| 4,789,379 | 12/1988 | Ozaki et al. | 474/82 |
| 4,842,568 | 6/1989 | Marchigiano | 474/80 |
| 5,238,458 | 8/1993 | Ishibashi | 474/82 |
| 5,295,916 | 3/1994 | Chattin | 474/78 |
| 5,380,252 | 1/1995 | Iwasaki et al. | 474/82 |
| 5,397,273 | 3/1995 | Ando | 474/82 |
| 5,597,366 | 1/1997 | Ozaki | 474/82 |
| 5,622,412 | 4/1997 | Yamane | 301/124.2 |
| 5,660,407 | 8/1997 | Adams | 474/82 |

FOREIGN PATENT DOCUMENTS

| | | | |
|---|---|---|---|
| 0 655 386 A1 | 5/1995 | European Pat. Off. | |
| 653347 A1 | 5/1995 | European Pat. Off. | B62M 9/12 |
| WO 97/07013 | 2/1997 | WIPO | B62K 25/02 |

*Primary Examiner*—John A. Jeffery
*Assistant Examiner*—Matthew A. Kaness
*Attorney, Agent, or Firm*—James A. Deland

[57] ABSTRACT

A quick-release bicycle derailleur includes a base member, a movable member supporting a chain guide, and a linkage mechanism coupling the base member to the movable member so that the movable member moves relative to the base member. A draw bar extends from the base member and has a cam follower at the base member. A rotary cam is supported by the base member and contacts the cam follower so that rotation of the rotary cam pulls the drawbar into the base member. A nut may be fitted to the other end of the draw bar so that the base member and the nut securely fix the derailleur to a pair of fork ends on the bicycle frame.

12 Claims, 6 Drawing Sheets

QUICK RELEASE DERAILLEUR

BACKGROUND OF THE INVENTION

The present invention is directed to bicycle components and, more particularly, to a bicycle derailleur which can be quickly installed to and removed from a bicycle frame.

Conventional bicycle rear derailleurs comprise a base member, a movable member supporting a chain guide, and a linkage mechanism coupling the base member to the movable member so that the movable member moves relative to the base member. The movable member includes a guide pulley for guiding the chain to one of a plurality of sprockets attached to the rear wheel. A through bore is usually formed in the base member, and a fixing bolt is fitted within the through bore for screwing the base member either directly to the bicycle frame or to a separate fixing member which, in turn, is directly attached to the bicycle frame. The derailleur is usually positioned below the rear wheel axle.

In order to operate properly, the radial position of guide pulley relative to the plurality of sprockets should be properly set. For derailleurs which have the base member rigidly fixed to the bicycle frame, the radial position of the guide pulley is set by adjusting the rotational position of the base member until the guide pulley has the desired position, and then the fixing bolt is tightened using a wrench. If the radial position of the guide pulley is to be readjusted, then the fixing bolt is loosened with the wrench, the rotational position of the base member is readjusted until the guide pulley has the desired new position, and then the fixing bolt is retightened with the wrench. The adjustment operation thus requires substantial effort and requires special tools. Furthermore, since the base member is usually positioned offset from the wheel axle, rotation of the base member to adjust the radial position of the guide pulley does not produce an intuitively predictable positioning of the guide pulley. Additionally, different frame manufacturers have different configurations for the attachment location of the derailleur. Not only does this further complicate the adjustment operation, but the derailleur designer cannot design a single derailleur that will work properly for all frame designs.

Another problem resulting from mounting the base member to the frame offset from the wheel axle is that the derailleur interferes with easy removal of the wheel. More specifically, the derailleur must be manually rotated so that the wheel can clear the derailleur when the wheel is removed from the frame. The derailleur again must be rotated when the wheel is to be reinstalled. The entire procedure often heavily soils the rider's hands, which can be very bothersome if the wheel must be removed to fix a flat.

SUMMARY OF THE INVENTION

The present invention is directed to a bicycle rear derailleur that can be quickly adjusted, installed and removed without requiring special tools, and which can be designed to operate with all frame designs. The derailleur can be removed separately or as an integral unit with the rear wheel.

In one embodiment of the present invention, a quick-release bicycle derailleur includes a base member, a movable member supporting a chain guide, and a linkage mechanism coupling the base member to the movable member so that the movable member moves relative to the base member. A draw bar extends from the base member and has a cam follower at the base member. A rotary cam is supported by the base member and contacts the cam follower so that rotation of the rotary cam pulls the drawbar into the base member. A nut may be fitted to the other end of the draw bar so that, when the drawbar is pulled into the base member, the base member and the nut securely clamp the derailleur to a pair of fork ends on the bicycle frame. If desired, a control lever may be coupled to the rotary cam and may extend outward from the base member so that rotation of the control lever causes rotation of the rotary cam to facilitate pulling and releasing the draw bar. As a result, the derailleur can be installed, removed and adjusted very quickly by rotating the control lever. No special tools are required.

The draw bar typically extends through a hollow axle shaft, so the base member will be centered on the rotational axis of the rear wheel. This facilitates adjustment and allows the derailleur designer to design a derailleur that will not be affected by different frame configurations.

In another embodiment, a quick-release bicycle derailleur includes a base member having a threaded opening, a movable member supporting a chain guide, and a linkage mechanism coupling the base member to the movable member so that the movable member moves relative to the base member. The threaded opening in the base member allows the base member to be screwed directly to the hub axle, if desired, or to a draw bar. In any event, the base member again will be centered on the rotational axis of the rear wheel, thus facilitating the design of the derailleur by the designer and adjustment of the derailleur by the user.

In a more specific embodiment, a draw bar has a first end coupled to the threaded opening in the base member and a second end spaced apart from the base member. A cam follower is disposed at the second end of the drawbar, and a housing is fitted over the second end of the drawbar. A rotary cam is supported by the housing and contacts the cam follower so that rotation of the rotary cam pulls the drawbar into the housing. This, in turn, causes the housing and the base member to securely clamp the derailleur to a pair of fork ends on the bicycle frame.

If desired, the base member may include a fixing nut rotatably supported in an opening in the base member. The fixing nut may include an external flange with knurls or a projection on the outer peripheral surface to facilitate rotation of the fixing nut by hand, or else the fixing nut can include a polygonal opening to facilitate rotation using a tool.

DETAILED DESCRIPTION OF THE EMBODIMENTS

Figure 1:
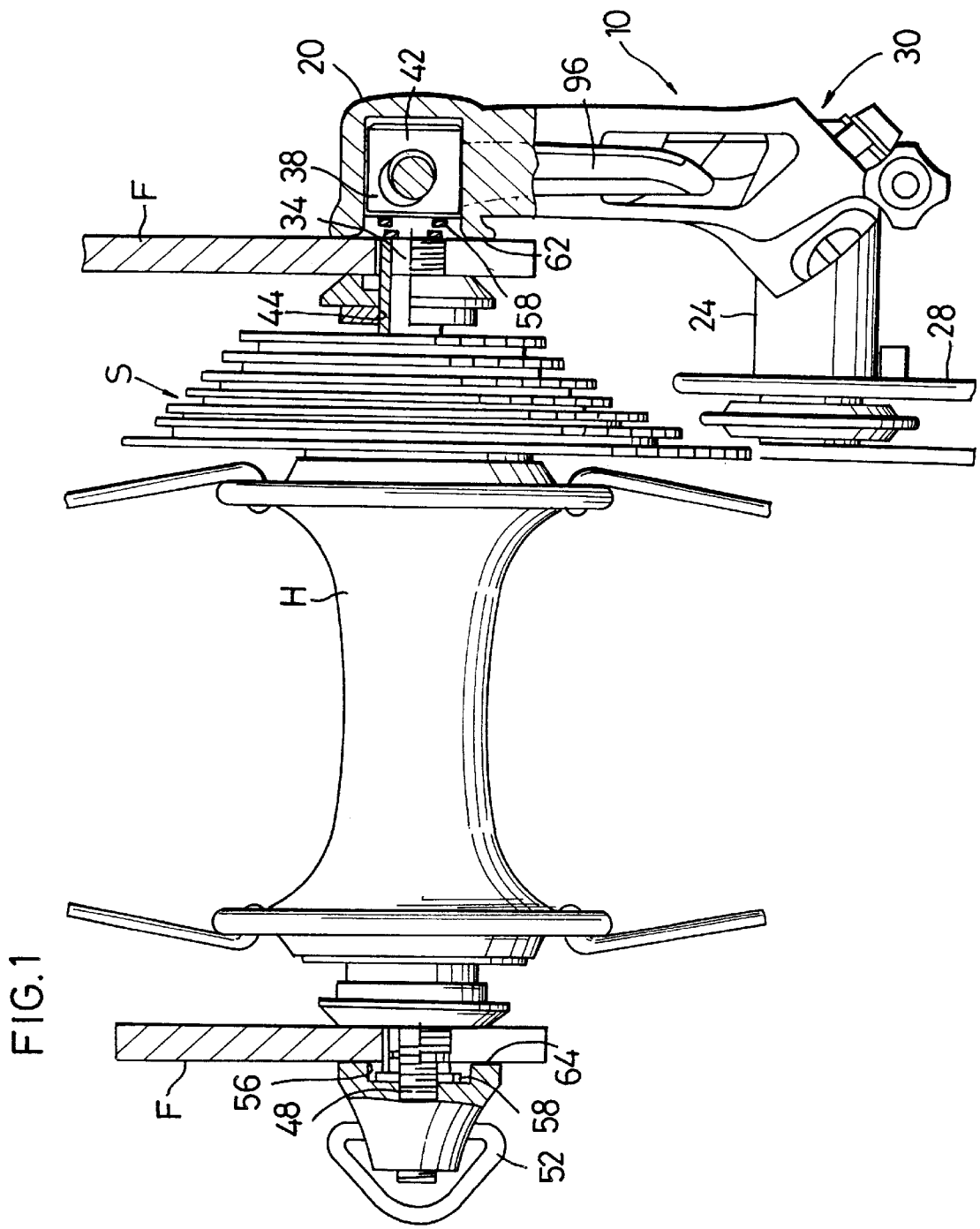
FIG. 1 is a rear view of a particular embodiment of a quick release derailleur according to the present invention.
Figure 2:
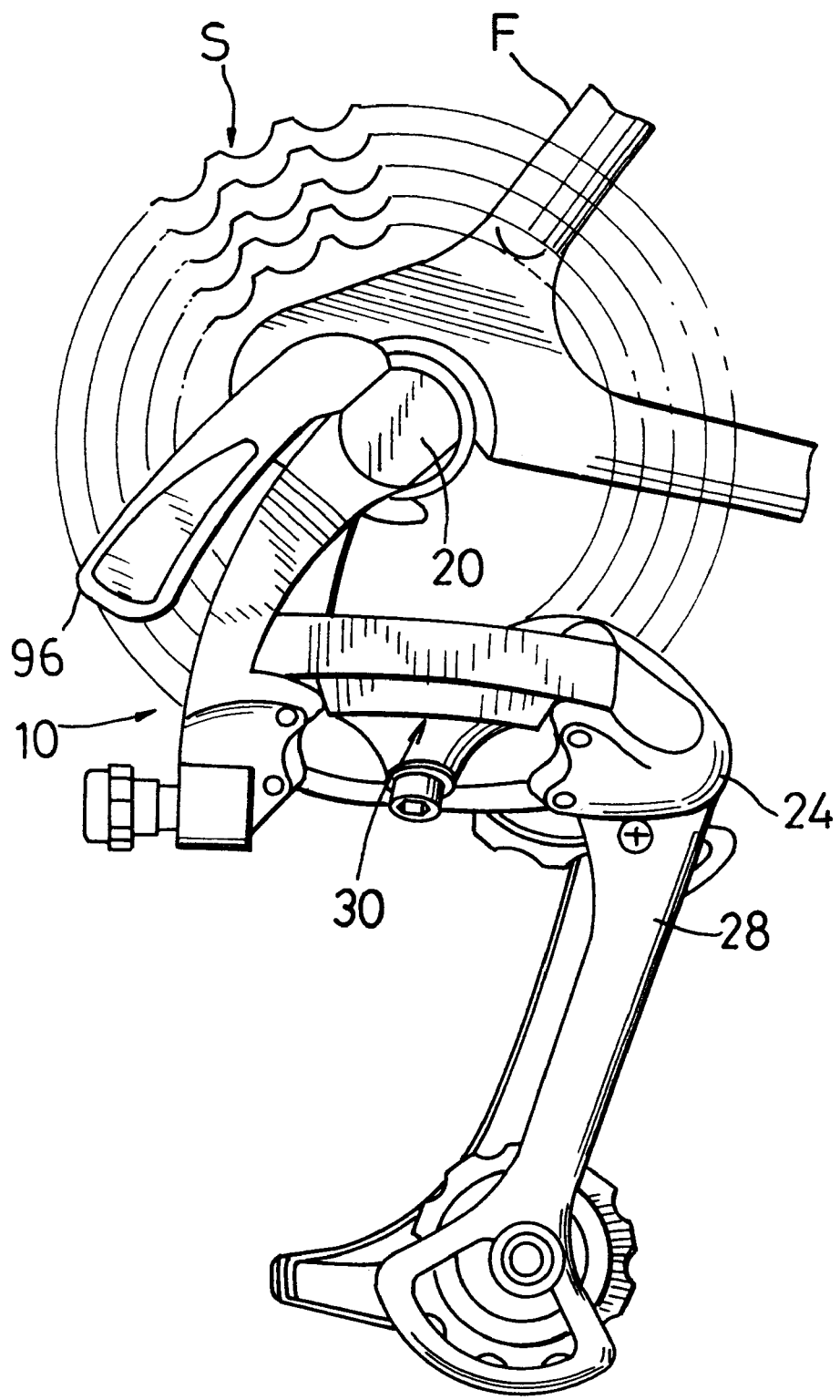
FIG. 2 is a side view of the quick release derailleur shown in FIG. 1.

FIG. 1 is a rear view of a particular embodiment of a quick release derailleur 10 according to the present invention as assembled to a rear wheel of a bicycle, and FIG. 2 is a side view of derailleur 10. Derailleur 10 includes a base member 20, a movable member 24 supporting a chain guide 28, and a linkage mechanism 30 coupling the base member 20 to the movable member 24 so that movable member 24 moves relative to base member 20. A draw bar 34 extends from the base member 20 and has a cam follower 38 fitted within base member 20. A rotary cam 42 is supported by base member 20 and contacts cam follower 38 so that rotation of rotary cam 42 in one direction pulls drawbar 34 into base member 20 (to the right in FIG. 1), and rotation of rotary cam 42 in the opposite direction allows drawbar 34 to move out of base member 20 (to the left in FIG. 1).

A hub H having a plurality of sprockets S is rotatably mounted between a pair of rear fork ends F through a hollow hub shaft 44. Draw bar 34 extends through hollow hub shaft 44 and terminates with a threaded end 48. A threaded nut 52 is screwed onto threaded end 48 of drawbar 34. Nut 52 includes a spring retainer opening 56 which houses a spring 58 for biasing draw bar 34 toward the left in FIG. 1. Base member 20 and nut 52 each include a knurled surface 62 and 64, respectively, for contacting their corresponding fork end F to prevent rotation of base member 20 or nut 52 which could cause loosening of the assembly.

Figure 3:
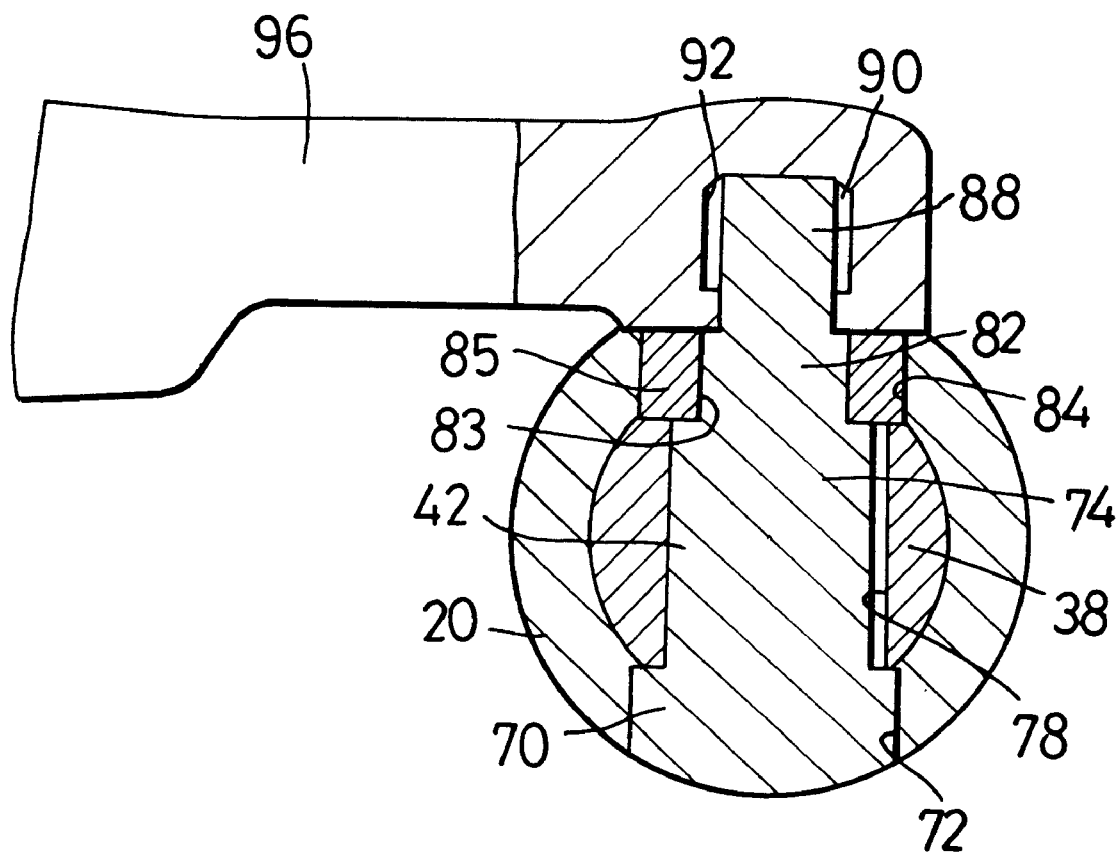
FIG. 3 is a cross sectional view of a particular embodiment of a cam mechanism housed within the base member of the derailleur shown in FIG. 1.

FIG. 3 is a cross sectional view of a particular embodiment of the cam mechanism housed within the base member 20 of derailleur 10 shown in FIG. 1. As shown in FIG. 3, cam 42 includes a large diameter portion 70 that fits within a corresponding bore 72 in one side of base member 20, an eccentric cam portion 74 fitted within an opening 78 in cam follower 38 of drawbar 34, a smaller diameter portion 82 that fits within a corresponding bore 83 of a retainer 85 which, in turn, fits within a bore 84 on the opposite side of base member 20, and a control shaft 88 that extends outside of base member 20. In this embodiment, control shaft 88 includes a splined outer peripheral surface 90 for nonrotatably engaging a corresponding splined inner peripheral surface 92 of a control lever 96. Thus, rotation of control lever 96 causes rotation of eccentric cam portion 74 to alternately pull draw bar 34 to the right in FIG. 1 or release draw bar 34 to the left in FIG. 1. Pulling draw bar 34 to the right causes base member 20 and nut 52 to press against their corresponding fork ends F which securely fixes derailleur 10 and hub H to fork ends F.

Figure 4:
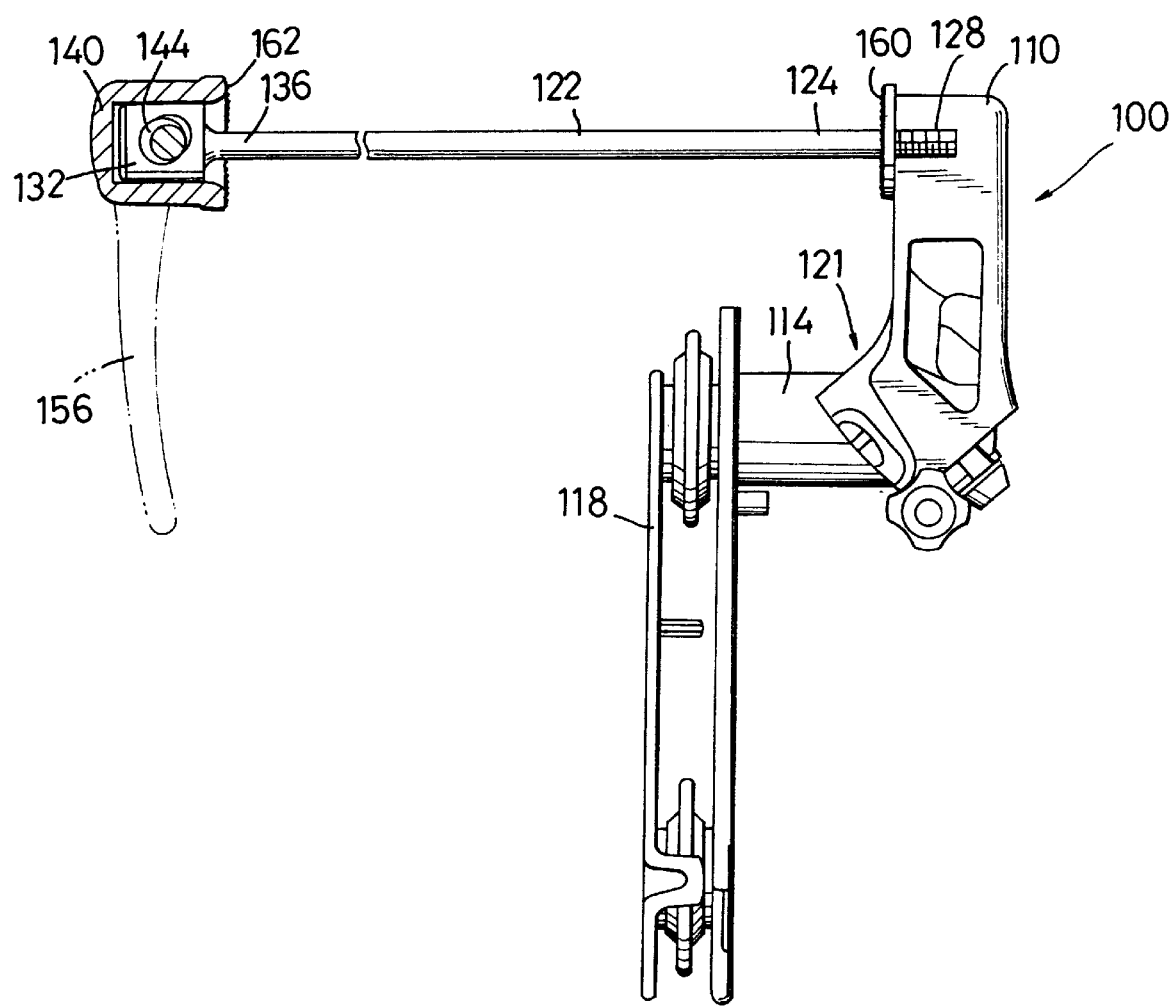
FIG. 4 is a rear view of an alternative embodiment of a quick release derailleur according to the present invention.

FIG. 4 is a rear view of an alternative embodiment of a quick release derailleur 100 according to the present invention. In this embodiment, derailleur 100 includes a base member 110, a movable member 114 supporting a chain guide 118, and a linkage mechanism 121 coupling the base member 110 to the movable member 114 so that the movable member 114 moves relative to base member 110. A draw bar 122 has a threaded first end 124 screwed into a blind threaded opening 128 formed in base member 110. A cam follower 132 is disposed at a second end 136 of drawbar 122. A housing 140 is fitted over the second end 136 of drawbar 122, and a rotary cam 144 is supported by housing 140.

Rotary cam 144 contacts cam follower 132 so that rotation of rotary cam 144 in one direction pulls drawbar 122 into housing 140 (to the left in FIG. 4), and rotation of rotary cam 144 in the opposite direction allows drawbar 122 to move out of housing 140 (to the right in FIG. 4). Rotary cam 144 may be constructed the same way as rotary cam 42 in FIG. 3, and it may include a control lever 156 to facilitate its operation. Base member 110 and housing 140 may include knurled surfaces 160 and 162, respectively, for tightly engaging respective fork ends in the same manner shown in FIG. 1.

Figure 5:
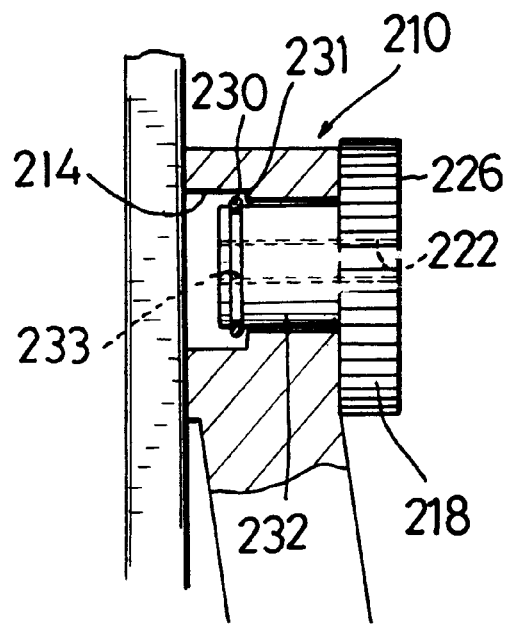
FIG. 5 is a cross sectional view of an alternative embodiment of a base member including a fixing nut which may be used with the embodiment of the derailleur shown in FIG. 4.

FIG. 5 is a cross sectional view of an alternative embodiment of a base member 210 that may be used in the embodiment of the derailleur shown in FIG. 4. In this embodiment, base member 210 includes a base member opening 214 which extends entirely therethrough. A fixing nut 218 having a fixing nut opening 222 and an external flange 226 is rotatably disposed in base member opening 214. In this embodiment, fixing nut 218 is rotatably retained within base member opening 214 by a snap ring 230 that fits within a groove on the outer peripheral surface of the inner portion 232 of fixing nut 218 and abuts against a radially inwardly extending abutment 231 of base member 210. Fixing nut opening 222 may includes threads 233 which may extend partially or entirely therethrough. Fixing nut 218 thus functions like nut 52 in the embodiment shown in FIG. 1, and it may be used as a coarse adjustment of the length of draw bar 122 so that there is no need to rotate control lever 156 to an inconvenient position.

Figure 6:
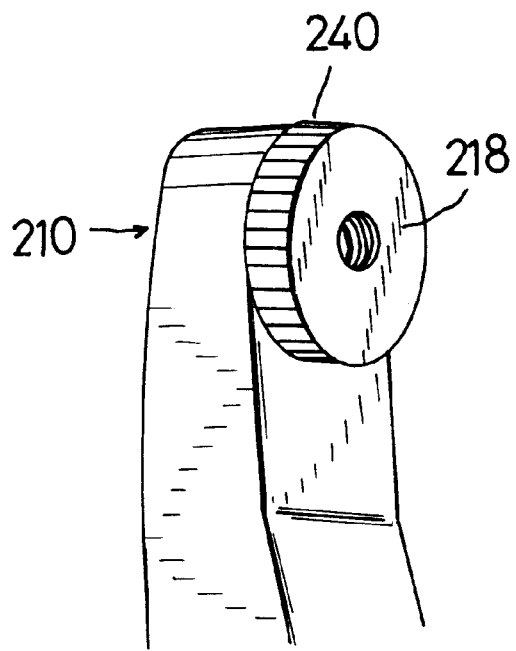
FIG. 6 is an oblique view of a particular embodiment of a fixing nut according to the present invention that may be used in the embodiment shown in FIG. 5.
Figure 7:
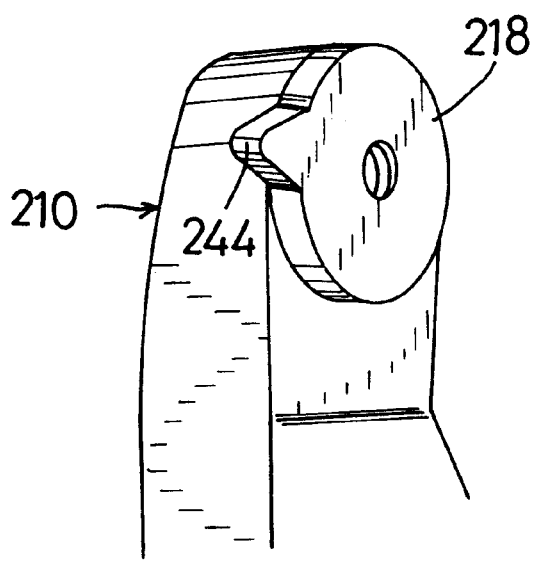
FIG. 7 is an oblique view of an alternative embodiment of a fixing nut according to the present invention that may be used in the embodiment shown in FIG. 5.

External flange 226 allows fixing nut 218 to be rotated by hand. To facilitate such rotation, knurls 240 may be disposed on the outer peripheral surface of flange 226 as shown in FIG. 6, and/or a projection 244 may extend from the outer peripheral surface of flange 226 as shown in FIG. 7.

Figure 8A:
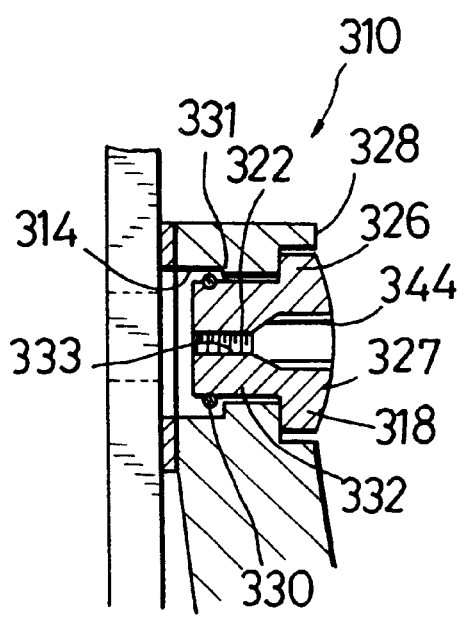
FIGS. 8A and 8B are cross sectional and oblique views, respectively, of another alternative embodiment of a base member including a fixing nut which may be used with the embodiment of the derailleur shown in FIG. 4.
Figure 8B:
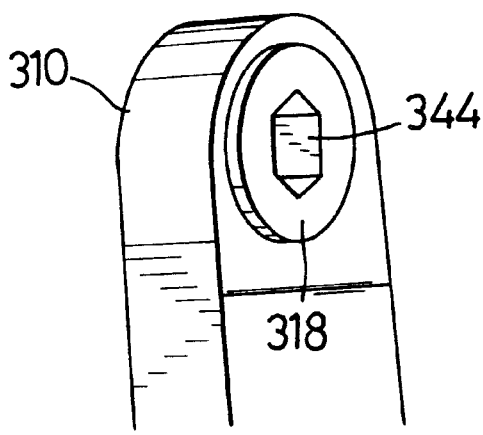

If a fixing nut having an external flange is not desirable, a base member 310 shown in FIGS. 8A and 8B may be constructed instead. In this embodiment, base member 310 includes a base member opening 314 which extends entirely therethrough. A fixing nut 318 having a fixing nut opening 322 and an internal flange 326 is rotatably disposed in base member opening 314. An external side surface 327 of fixing nut 318 is approximately flush with an external side surface 328 of base member 310. In this embodiment, fixing nut 318 is rotatably retained within base member opening 314 by a snap ring 330 that fits within a groove on the outer peripheral surface of the inner portion 332 of fixing nut 318 and abuts against a radially inwardly extending abutment 331 of base member 310. Fixing nut opening 322 includes threads 333 on the inner portion 332, and fixing nut opening 322 opens into an irregularly shaped opening 344 that, in this embodiment, may be a polygon such as a hexagon that is more clearly shown in FIG. 8B. A tool such as a hexagonal wrench (not shown) may be inserted into the hexagonally shaped portion of fixing nut opening 322 for rotating fixing nut 318. Although this embodiment requires the use of a special tool, the derailleur still has the benefit of centering the base member on the rotational axis of the rear wheel, thus facilitating adjustment and making it possible for the derailleur designer to design a derailleur that can be used with any frame.

Figure 9:
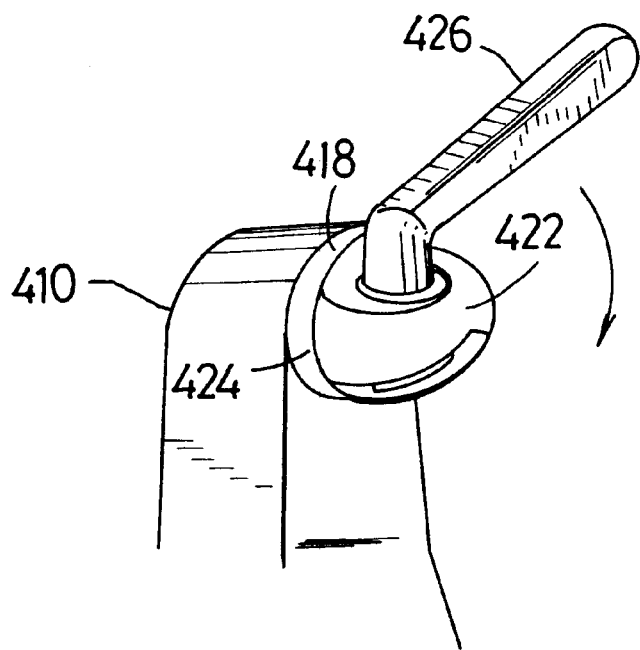
FIG. 9 is an oblique view of another alternative embodiment of a base member including a fixing nut which may be used with the embodiment of the derailleur shown in FIG. 4.

FIG. 9 is an oblique view of another alternative embodiment of a base member 410 including a fixing nut 418 which may be used with the embodiment of the derailleur shown in FIG. 4. In this embodiment, fixing nut 418 may be rotatably mounted within the base member opening as in the embodiments shown in FIGS. 5 and 8A, or else fixing nut 418 may be nonrotatably mounted to base member 410. Fixing nut 418 includes a housing section 422 attached to flange 424. A control lever 426 may be rotatably or nonrotatably mounted to housing section 422. If control lever 426 is rotatably mounted to housing section 422, then housing section 422 may include a cam mechanism similar to the cam mechanism shown in FIG. 4, or else the cam mechanism may be omitted in which case rotation of control lever 426 will not axially move the draw bar.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims.

What is claimed is:

1. A bicycle derailleur for attachment to a wheel having a hollow hub axle comprising:
    a base member;
    a movable member supporting a chain guide;
    a linkage mechanism coupling the base member to the movable member so that the movable member moves relative to the base member;
    a draw bar extending from the base member and having a cam follower at the base member, the drawbar being sized to extend through the hollow axle; and
    a rotary cam supported by the base member and contacting the cam follower so that rotation of the rotary cam pulls the drawbar into the base member.

2. The derailleur according to claim 1 further comprising a nut fitted to a free end of the draw bar.

3. The derailleur according to claim 2 wherein the free end of the draw bar is threaded, and wherein the nut is screwed to the free end of the drawbar.

4. The derailleur according to claim 1 further comprising a control lever coupled to the rotary cam and extending outwardly of the base member so that rotation of the control lever causes the rotation of the rotary cam.

5. The derailleur according to claim 1 wherein the base member includes a knurled surface for contacting a frame of a bicycle.

6. The derailleur according to claim 1 wherein the rotary cam is disposed within the base member.

7. A bicycle derailleur apparatus comprising:
    a wheel hub that rotates around a hollow hub axle;
    a derailleur including:
        a base member;
        a movable member supporting a chain guide;
        a linkage mechanism coupling the base member to the movable member so that the movable member moves relative to the base member;
        a draw bar extending from the base member through the hollow hub axle and having a cam follower at the base member; and
        a rotary cam supported by the base member and contacting the cam follower so that rotation of the rotary cam pulls the drawbar into the base member.

8. The derailleur according to claim 7 further comprising a nut fitted to a free end of the draw bar.

9. The derailleur according to claim 8 wherein the free end of the draw bar is threaded, and wherein the nut is screwed to the free end of the drawbar.

10. The derailleur according to claim 7 further comprising a control lever coupled to the rotary cam and extending outwardly of the base member so that rotation of the control lever causes the rotation of the rotary cam.

11. The derailleur according to claim 7 wherein the base member includes a knurled surface for contacting a frame of a bicycle.

12. The derailleur according to claim 7 wherein the rotary cam is disposed within the base member.

* * * * *